B. A. SHAW.
TRAP.
APPLICATION FILED JAN. 11, 1913.
1,089,975.
Patented Mar. 10, 1914.
2 SHEETS—SHEET 2.
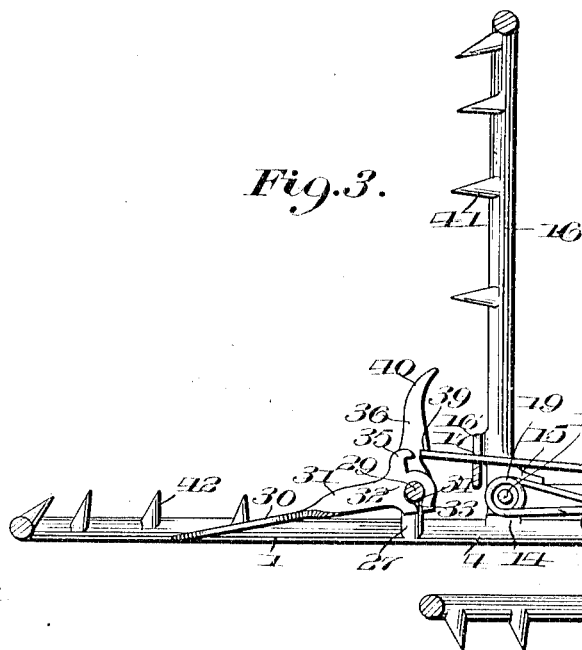
Inventor
Bruce A. Shaw
Witnesses
By Victor J. Evans
Attorney

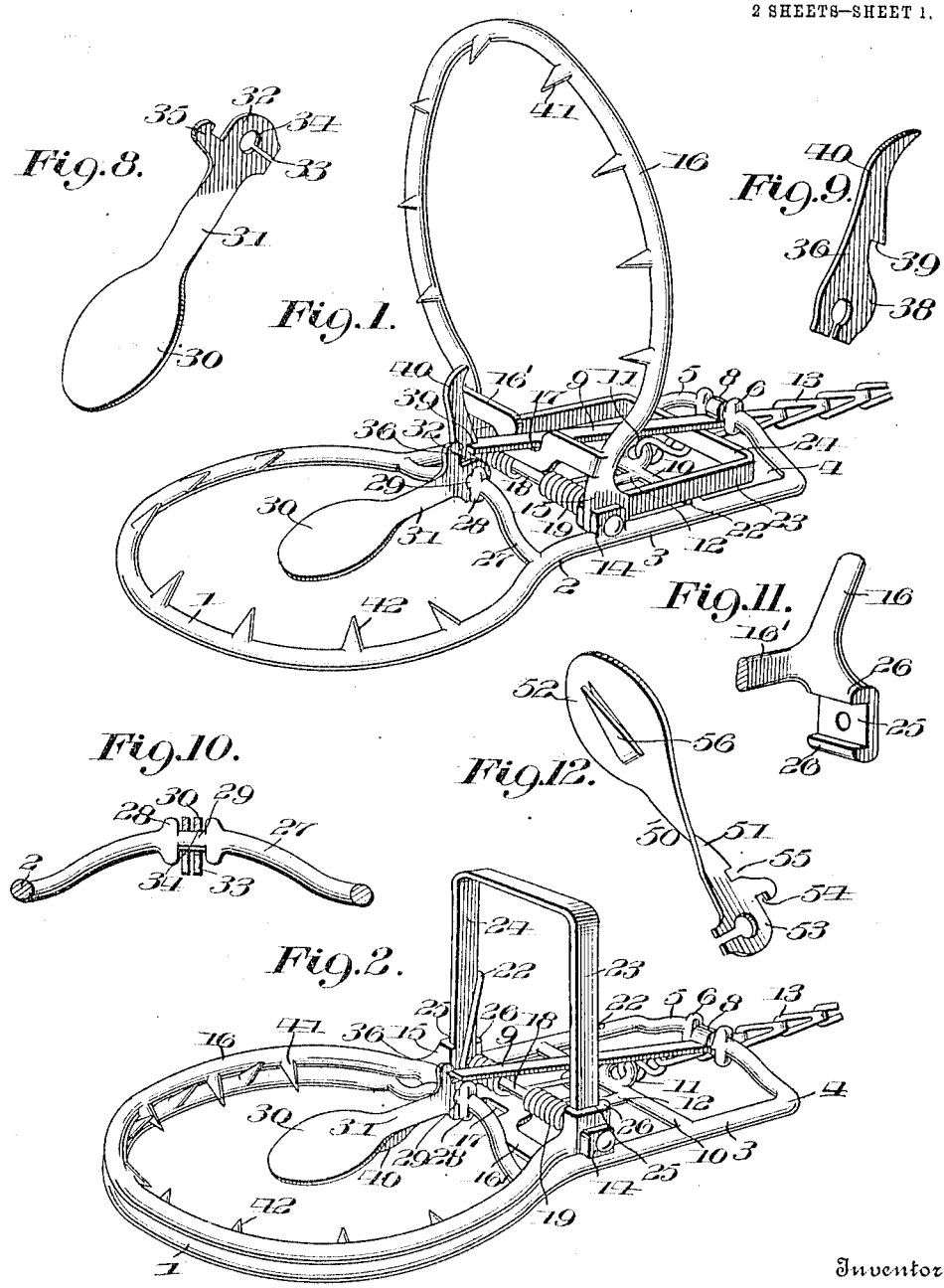

UNITED STATES PATENT OFFICE.

BRUCE A. SHAW, OF OAK PARK, ILLINOIS.

TRAP.

1,089,975.

Specification of Letters Patent.

Patented Mar. 10, 1914.

Application filed January 11, 1913. Serial No. 741,498.

*To all whom it may concern:*

Be it known that I, BRUCE A. SHAW, a citizen of the United States, residing at Oak Park, in the county of Cook and State of Illinois, have invented new and useful Improvements in Traps, of which the following is a specification.

This invention relates to animal or fish traps; and it has for its object the provision of a trap which will include a keeper locking bail which will include relatively adjustable portions normally engaged with the pivoted spring jaw and adjustable with relation thereto so that the bail may be folded to an inoperative setting position, where it will lie parallel with both the fixed and movable jaws and thereby permit the trap when folded to assume an extremely compact package.

Another object of the invention is the provision of a chain support on the fixed jaw of the trap and the arrangement of said support, whereby the trap may be suspended in a true perpendicular position from the chain when the trap is used for catching fish or water-living animals.

Another object of the invention is to provide a set of triggers which may be individually presented for operative engagement with the keeper of the trap and used according to the character of the animal to be entrapped. In other words, one of the triggers is designed to form a bait holder and means for holding the keeper of the trap in operative set position and for catching the animal's head first, while the other trigger is provided with a foot treadle and is adapted to catch rats or small game.

Another object of the invention is to construct the locking triggers so that it will be impossible to engage both triggers with the keeper at the same time.

With these and other objects in view, the invention consists of certain novel features of construction, combination and arrangement of parts, as will be hereinafter described and claimed.

In the accompanying drawings: Figure 1 is a perspective view of the trap in a set position; Fig. 2 is a similar view, showing the comparion jaws in relatively closed position; Fig. 3 is a longitudinal section through the trap, showing the same in a set position; Fig. 4 is a similar view, showing the trap in a set position and illustrating the position of the jaws when suspended from a chain; Fig. 5 is a longitudinal section through the trap, showing the locking bail folded; Fig. 6 is a transverse section through the trap and through the bail illustrating the operative association of the relatively adjustable sides of the bail with the engaging portions of the movable jaw; Fig. 7 is a longitudinal section through the spring rest of the fixed jaw; Fig. 8 is a perspective view of one of the triggers; Fig. 9 is a similar view of the other trigger; Fig. 10 is a transverse section through the fixed jaw, showing the trigger supporting portion thereof; and Fig. 11 is a detail perspective view of one of the bail engaging portions of the movable jaw. Fig. 12 is a perspective view of a slightly modified form of the invention.

The trap comprises a fixed jaw 1, which is substantially of circular configuration and provided with portions 2, which are extended into the side arms 3 of a substantially rectangular base 4. The side arms of said base 4 are connected with each other at their rear ends by a bar 5, which is curved upwardly and away from the side arms and provided intermediate of its ends with spaced stop lugs 6 and an intervening cylindrical stem 7. The loop or eye 8 of a metallic flat keeper 9 is confined between the lugs 6 and associated with the stem 7 so that the keeper may be readily swung to an operative jaw setting position. Forwardly of the bar 5 the side arms 3 are connected together by a straight bar 10, the latter having a rear eye 11 and a forward loop 12. The eye is extended substantially at an obtuse angle from the bar and it is shown to have connected therewith one terminal of an anchoring or suspending chain 13. By arranging the eye as just described, it will be seen that said chain may be extended beneath the bar 5 at the center thereof when the trap is in lying position upon the ground and thereby insure a firm seating of the trap as will be apparent. The construction is also such that the chain will be permitted to pass immediately beside the concavity of the bar 5, so as to permit the trap to be suspended in a true perpendicular position when it is immersed in the water.

Adjacent to the portions 2 of the fixed jaw 1 are vertically rising ears 14 against the insides of which are disposed the terminals 15 of a pivoted jaw 16, the configuration of the latter being substantially identical with the fixed jaw and as shown the opposite side portions of said pivoted jaw are connected at points adjacent to the terminals 15 by a brace bar 16', the latter having a central depression 17 to accommodate the keeper when the movable jaw is in a set position. A pivot pin 18 is extended through the alined ears 14 and through the terminals 15 and as shown said pin is embraced by companion springs 19, each having an inner terminal extended into a depression 20 of the bar 21 of the loop 12 and an outer terminal which is hooked at 22 and engaged against the adjacent side arm 23 of a setting bail 24. The side arms of the bail are mounted for longitudinal adjustments on the pivot pin of the movable jaw and under the inherent action of the bail the said side arms thereof are adapted to be yieldingly and operatively extended into recesses 25 formed in the inner faces of the terminals 15 and defined by relatively spaced lugs 26. In this manner, it is evident that the side arms of the bail may be disconnected from the movable jaw so as to relieve the latter of spring tension and then permit the bail to be folded down to a horizontal position and parallel with both jaws so that the trap may be folded into a very compact package for shipment or storage.

Forwardly of the pivot pin, the portions 2 of the fixed jaw are connected together by a bar 27, which is curved upwardly toward its center and provided with spaced lugs 28 and a connecting cylindrical portion 29. The foot operated trigger of the trap comprises a single piece of sheet metal which is twisted in its main length to provide a horizontal, relatively broad treadle 30 and a shank 31, the latter having a circular extremity 32, which is split radially at 33 and provided with a central opening 34 which receives the cylindrical intermediate portion of the bar 27. Said circular portion of the trigger is provided with an integral hook 35, which is adapted to receive the free extremity of the pivoted keeper 9. The other trigger 36 is constructed from a single piece of flat sheet metal having a circular portion 38 pivotally mounted on the intermediate cylindrical portions of the bar 27 and provided with a hook 39 whose effective keeper engaging portion is disposed beyond the effective keeper engaging portion of the hook on the foot operated trigger, so as to positively prevent both triggers from engaging the keeper bar 9 at the same time (see Fig. 3). The second trigger is provided with a relatively long shank 40, to which the bait is adapted to be connected. If desired the movable jaw is provided with downwardly extending teeth 41, while the fixed jaw is provided with upwardly extending teeth 42, the latter being staggered with relation to the former when both jaws are closed relatively.

In the modified form of the invention shown in Fig. 12, the trigger 50 includes a shank 51 having a treadle portion 52 and an attaching portion 53, the latter having notches 54 and 55 which are arranged in different relative planes whereby they may be singly engaged with the keeper 9 as may be required. The treadle portion 52 has stamped therefrom a bait hook 56.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention, as claimed.

Having thus described my invention, what I claim is:—

A trap comprising a fixed jaw, a movable jaw, lugs rising from the fixed jaw, ears formed at the terminals of the movable jaw and lying at the sides of the lugs and provided with inwardly opening recesses, a pin passing through the lugs and through the ears, a yieldable bail of U-form wholly supported by the pin and having relatively yieldable branches operable for projection into the recesses in the ears under the inherent elasticity of the bail, a spring bearing against the bail and exerting its force to hold the movable jaw under tension, and trigger means for engaging the bail and for holding the movable jaw in set position.

In testimony whereof I affix my signature in presence of two witnesses.

BRUCE A. SHAW.

Witnesses:
 H. N. LEADAMAN,
 C. P. BELLING.

---

Copies of this patent may be obtained for five cents each, by addressing the "Commissioner of Patents, Washington, D. C."